United States Patent [19]

Sigalla

[11] Patent Number: 4,784,353
[45] Date of Patent: Nov. 15, 1988

[54] AIRCRAFTS TAIL SECTION DRAG COMPENSATING FOR NOSE-DOWN PITCHING MOMENT

[75] Inventor: Armand Sigalla, Bellevue, Wash.

[73] Assignee: The Boeing Company, Seattle, Wash.

[21] Appl. No.: 471,265

[22] Filed: Mar. 2, 1983

[51] Int. Cl.$^4$ .............................................. B64C 5/06
[52] U.S. Cl. .................................................... 244/91
[58] Field of Search .................. 244/87, 91, 113, 160, 244/36, 225

[56] References Cited

U.S. PATENT DOCUMENTS

| | | |
|---|---|---|
| 1,727,014 | 9/1929 | Kucher . |
| 1,780,813 | 11/1930 | Burnelli .............................. 244/36 |
| 2,385,845 | 10/1945 | Schairer . |
| 2,775,419 | 12/1956 | Hlobil . |
| 3,025,027 | 3/1962 | Ferreira . |
| 3,270,988 | 9/1966 | Cone, Jr. . |
| 3,285,542 | 11/1966 | Holmquist . |
| 4,291,853 | 9/1981 | Sigalla . |

FOREIGN PATENT DOCUMENTS 787102 12/1957 United Kingdom ................ 244/113

OTHER PUBLICATIONS

"EF-111A-Grumman, TF-15A-McDonnell Douglas", Jane's All The Worlds's Aircraft, 1977-78, pp. 307-308, 341-345.
"Space Shuttle Orbiter, Rockwell International", Jane's All The World's Aircraft, 1982-83, pp. 715-716.

Primary Examiner—Joseph F. Peters, Jr.
Assistant Examiner—Rodney Corl
Attorney, Agent, or Firm—Christensen, O'Connor, Johnson & Kindness

[57] ABSTRACT

In an aircraft exhibiting an undesirable nose-down pitching moment due to a rearward shift of the wing lift acting aft of the characteristic pitch axis of the aircraft as speed increases in a certain speed regime, the vertical member of the tail section is configured to develop an increasing drag. The increasing tail member drag acts in elevation above the horizontal plane that contains the pitch axis so as to develop a counteracting nose-up pitching moment that mitigates the unwanted nose-down pitching component associated with changing wing lift characteristics.

9 Claims, 4 Drawing Sheets

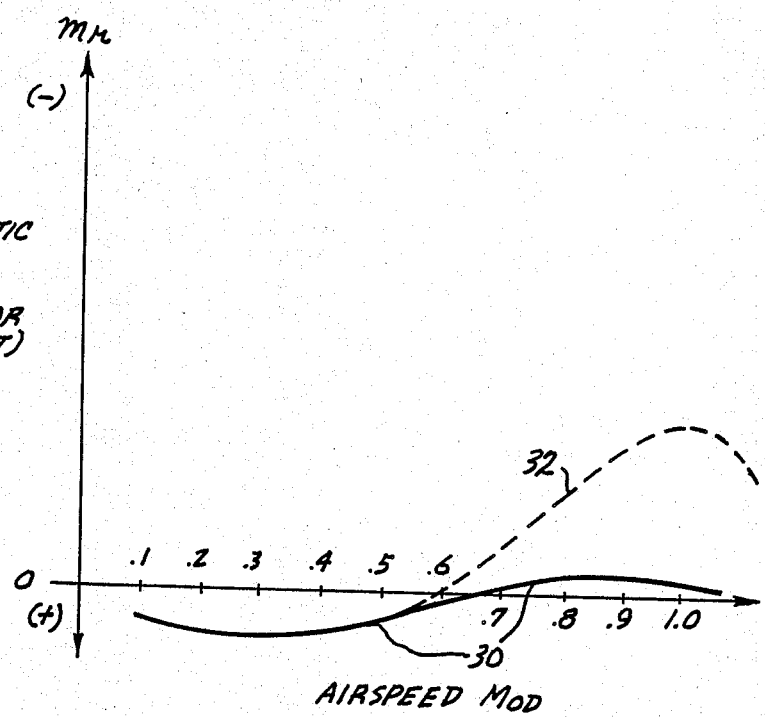
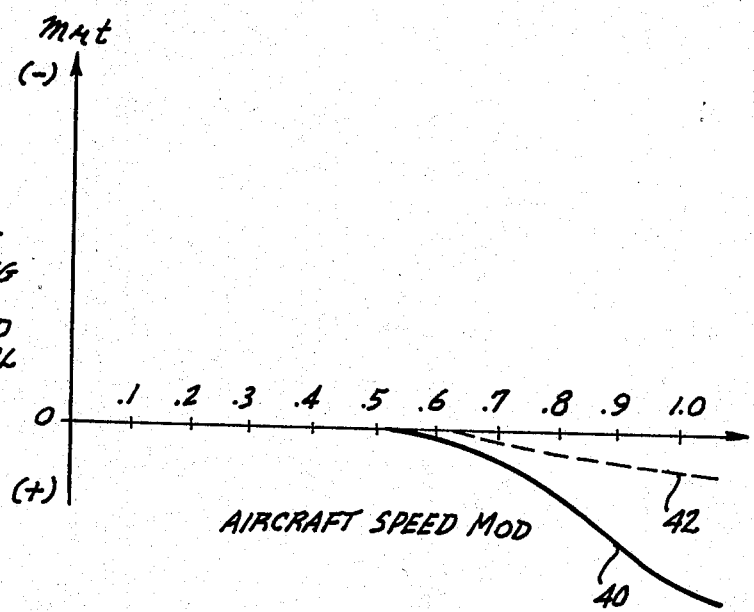

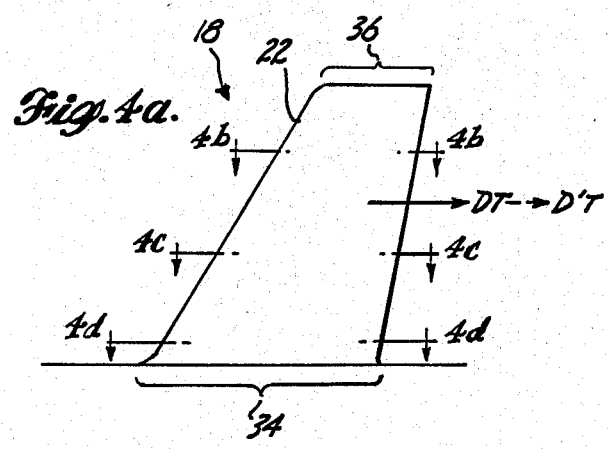
*Fig. 4a.*
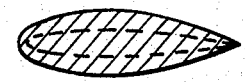
(CONVENTIONAL DOTTED LINE)
(INCREASING PITCH DOWN DRAG COMPONENT SOLID LINE)
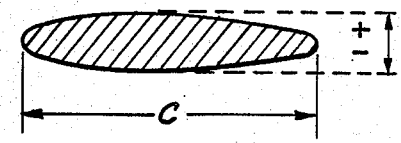
*Fig. 4d.*
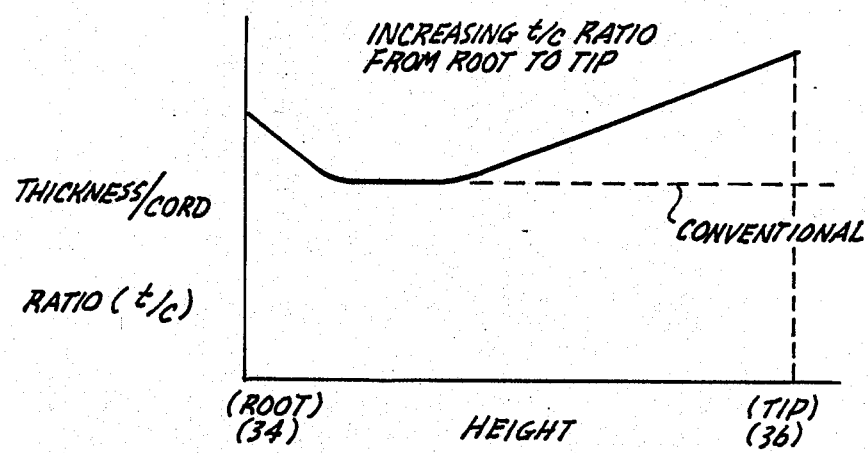
*Fig. 4e.*

AIRCRAFTS TAIL SECTION DRAG COMPENSATING FOR NOSE-DOWN PITCHING MOMENT

BACKGROUND OF THE INVENTION

This invention relates to the construction of an aircraft so as to eliminate an undesirable flight characteristic exhibited by certain aircraft in which a nose-down pitching moment occurs as a function of increasing speed.

On present day swept wing jet transports, the axis of pitch of the airplane extends laterally through the center of gravity of the airplane and is typically located at approximately 25% of the mean aerodynamic chord of the wing. The center of lift of the wings are generally located rearward of the pitch axis. Thus, the lifting forces generated by the wings create a pitching moment that tends to force the nose of the airplane down. In stable horizontal flight, the pitching moment created by the lift of the wings is counteracted by a downward force exerted by the airplane's horizontal stabilizer.

On many airplanes, when increasing speed at a constant altitude, a nose-down pitching moment of increasing magnitude develops. This pitching moment is caused by the rearward shift of the center of lift of the wings as the airplane speed increases. As the nose of the airplane is pushed downwardly, the airplane picks up more speed, which in turn causes the pitching moment to increase, thereby causing a further increase in speed. The situation becomes progressively worse unless timely action is taken by the pilot or by some other means such as autopiloting controls.

This flight characteristic adds instability and may become more so due to an unpredictable flight environment, including local ambient wind patterns, e.g., gust upsets, wind shear and other disturbances.

The added flight instability places undesirable demands on the skill and alertness of the pilot who must compensate for the nose-down tendency, and for this reason, prior solutions to the problem have favored automatic controls, not dependent on pilot response.

One prior art solution has been the addition of an autopilot subsystem that senses the nose-down pitching moment and applies corrective elevator changes automatically. This approach works in counteracting the nose-down pitching moment; however, there are drawbacks. One is that the complex electrical and mechanical subsystems that make up the automatic control adds an element of unreliability. Other drawbacks include increased cost, weight and maintenance requirements. Moreover, on an airplane with a serious nose-down pitching moment problem, the authority demanded by an automatic system would be so high that it would introduce its own instability and other complexities, because additional subsystems would be needed to protect the airplane from hard over control actions.

It can be seen that when correcting the nose-down pitching moment of an airplane, it is desirable to have a mechanically simple system that is highly reliable and that will not add weight to the airplane or increase its cost or maintenance requirements.

SUMMARY OF THE INVENTION

In accordance with the present invention, the vertical member of the tail section is configured between the root attachment to the fuselage and the tip of such member to develop an increasing drag as a function of aircraft speed, in which the magnitude of the drag and the effective location at which such drag acts on the vertical tail member are selected so as to counteract the above-mentioned nose-down pitching component due to the changing lift forces on the aircraft wing as the aircraft increases in speed while in nominally level flight.

In a preferred form of the invention, the vertical tail member has a configuration for increasing the effective drag that comprises a thickness to chord ratio (t/c) that varies between the root and tip of the member as follows. Initially, the ratio (t/c), starting at the root, decreases with member height, and thereafter increases with height to the member tip.

In another preferred form of the invention, the vertical tail member is configured to develop the compensating drag by decreasing the angle of rearward and upward sweep of such tail member relative to the angle of sweep that the tail member is designed to have for maximum flight efficiency. The decreased sweep of the vertical tail member causes an increasing drag component as a function of tail member height and is accompanied by a slight loss in flight efficiency.

By selective configuration of the vertical tail member in this manner, aircraft having characteristic cruise speeds of from approximately Mach 0.5 to 1.0 and exhibiting a nose-down pitching moment, due to aft movement of the wing lift with increasing speed, are capable of being corrected of the inherent nose-down tendency by the added drag characteristics of the vertical tail member. While absent the compensating effect of the vertical tail member, such an aircraft might exhibit a nose-down pitching moment that increases significantly as the airspeed advances from about Mach 0.5 to 1.0 (falling off thereafter due to airflow separation). The tail member drag compensation in accordance with the invention counteracts the nose-down moment so that the net pitching moment of the aircraft remains nearly constant as a function of airspeed, freeing the pilot and/or autopilot from the need to make corrective airfoil adjustments.

To provide a complete disclosure of the invention, reference is made to the appended drawings and the following description of certain particular and preferred embodiments.

BRIEF DESCRIPTION OF THE DRAWINGS

FIG. 3 is a graph plotting the characteristic pitching moment of a particular aircraft against the upstream air speed of the aircraft;

FIG. 4a is a fragment, in elevation, of the vertical member of the tail section configured in accordance with the invention;

FIGS. 4b, 4c and 4d are horizontal cross sections taken through the tail member of FIG. 4a at different height positions thereon as indicated by section lines 4b—4b, 4c—4c and 4d—4d; and, FIG. 4e is a graph of the thickness to chord ratio (t/c) plotted as a function of the height of the vertical tail member of FIG. 4a between its root and tip;

FIG. 4f is a graph in which the component of pitching moment attributed to the vertical tail member configured in accordance with FIGS. 4a, 4b, 4c and 4d is plotted as a function of aircraft speed;

DETAILED DESCRIPTION OF PREFERRED EMBODIMENT

Figure 1:
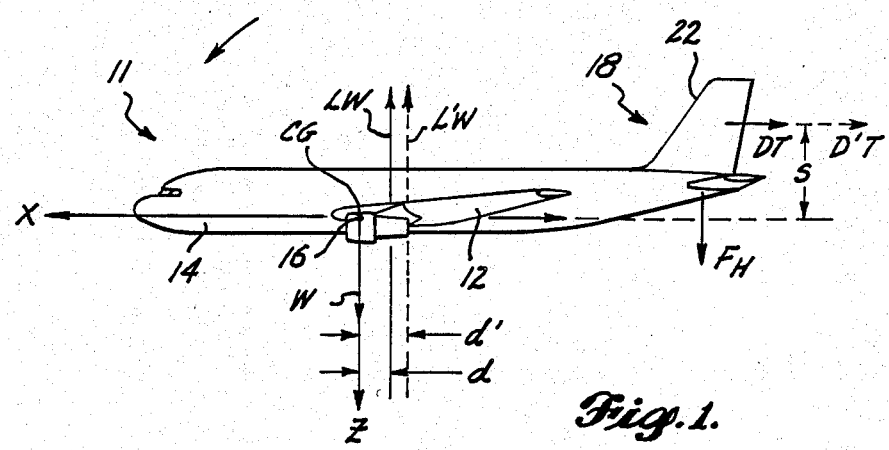
FIG. 1 is a view in elevation of an aircraft in level flight showing the various wing and tail section forces which influence the moment of the aircraft about the pitching axis.
Figure 2:
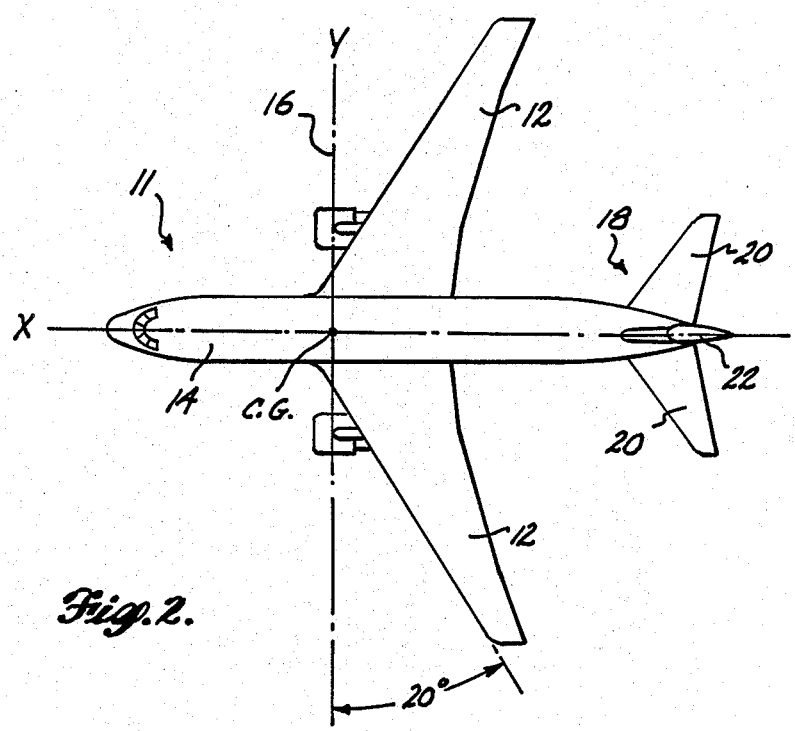
FIG. 2 is a top plan view of the aircraft of FIG. 1 showing the axis of pitch as a broken line.

With reference to FIG. 1, the invention is embodied in an aircraft 11 of a conventional, subsonic aircraft of the type used for commercial, passenger and cargo transportation, and having a characteristic speed-dependent, nose-down pitching component that is due to a rearward shifting of the center of lift pressure on the wings as aircraft 11, while in level flight, increases its air speed in a predetermined subsonic speed regime. This characteristic speed-dependent, nose-down pitching effect is sometimes called "Mach tuck." More particularly as shown in FIG. 1, the "Mach tuck" is the result of changing lift effects on wings 12 mounted near mid-body of fuselage 14, which produce a speed-dependent moment tending to rotate the aircraft about its pitch axis 16 (see FIG. 2) passing laterally through the aircraft at its center of gravity (C.G.).

Pitch axis 16 may be thought of as the Y axis (see FIG. 2) in a three dimensional X, Y, Z coordinate system in which C.G. is at the origin, the Y axis corresponds to the pitch axis 16. The weight of the aircraft, when in level flight, acts downwardly along the Z axis and the X axis corresponds to the longitudinal axis of the aircraft and forms a horizontal plane with the Y axis. Hence, the X-Y horizontal plane includes the pitch axis 16.

At the low end of the speed regime, the lift pressure acting on wings 12 is shown by the solid, upwardly directed arrow marked LW and for aircraft 11, this lift pressure LW acts aft the center of gravity C.G. and, hence, at a distance d rearwardly along the X axis from the origin of the above-defined X, Y, Z coordinate system. At this speed, LW, acting through distance d, produces a counterclockwise or nose-down rotation of aircraft 11 as it is shown in FIG. 1 about pitching axis 16. For this particular low end speed within a characteristic speed regime, the overall aerodynamic forces on aircraft 11, including those attributed to tail section 18, are such that pitching component due to LW×d is counteracted and neutralized by forces on the aircraft producing an opposite and equal moment. For example, the force pressure $F_H$ acting downwardly on stabilizer 20 of tail section 18 acts through a moment arm along the X axis, which creates a nose-up pitching component that, at a specific or narrow low end speed range within the above-mentioned speed regime, compensates for the nose-down pitching component LW×d due to lift pressure on wings 12.

However, as the aircraft speed increases within the speed regime, there is a tendency for the wing lift pressure to shift rearwardly along the X axis as indicated by the dotted line position of lift pressure L'W. The moved lift pressure L'W may occur at the upper end of the speed regime and as shown in FIG. 1, this pressure has shifted rearwardly to a distance d' by an amount Δd equal to d'-d. The lift force L'W now acts through a larger moment arm of distance d', while the otherwise matching, counteracting nose-up pitching component resulting from stabilizer force $F_H$ has not shifted position along the X axis by any appreciable amount. The net effect is a speed-dependent, nose-down pitching component attributed to the shift Δd in the center of lift pressure on wings 12. This speed-dependent pitching component pushes the nose of the airplane down, changing the angle of attack and causing the airplane to pick up more speed. As the speed increases, a further rearward shift of the center of lift pressure force L'W occurs which in turn worsens the "Mach tuck" effect. The chain of effects creates a progressively worsening situation that must be counteracted by either manual or automatic piloting of the aircraft to alter flaps (not shown) on wings 12 and/or on stabilizer 20.

In order to avoid the undesirable requirement of manual or automatic pilot correction of the speed-dependent "Mach tuck" effect, the vertical tail member 22 of aircraft 11 is modified as shown in FIG. 4a to interact with the airstream to develop a drag component DT that increases to a magnitude D'T with increasing speed in the above-mentioned speed regime, and acts through a moment arm of distance s above the X,Y plane (see FIG. 1). The speed-dependent drag increment of D'T−DT acting over moment arm s produces a speed-dependent, nose-up pitching component about axis 16 which counteracts the "Mach tuck" effect.

The reduction of "Mach tuck" achieved by reconfiguring member 22 of tail section 18 is illustrated in the graph of FIG. 3 in which the solid line is a plot of the net pitching moment $m\mu$ as a function of upstream air speed $M\infty$. As shown, $m\mu$ varies only slightly above and below a zero value, indicating stable, level flight with negligible net pitch up or pitch down effect as a function of speed $M\infty$. The solid line corresponding to aircraft 11 having the modified tail section is indicated by reference numeral 30.

In contrast to the compensated aircraft shown by the plot of solid line 30 in FIG. 3, an uncompensated aircraft without the modified tail section of FIG. 4a will typically show a net piching moment $m\mu$ that follows dotted line 32 in FIG. 3, developing a substantial increase in the nose-down pitching moment $m\mu$ (negative) with increasing airspeed in the range of from 0.6 to 0.9 $M\infty$. As the aircraft speed approaches $M\mu=1$ and above, flow separation causes loss of lift and the pitching moment $m\mu$ falls off sharply. However, for the useful speed regime of the presently disclosed aircraft, which is in the range of approximately $M\infty$ 0.4 through approximately 0.9, the rising negative magnitude of $m\mu$ for the uncompensated aircraft plotted by dotted line 32 demonstrates the problem of "Mach tuck" on an aircraft not incorporating the present invention.

To achieve the compensating drag DT increasing to D'T (FIG. 1), vertical member 22 is preferably shaped so that the upper, approximately two-thirds of member 22 exhibits an increasing thickness to chord ratio (t/c) relative to a conventional t/c ratio selected solely for minimal drag and optimum lateral stability. The larger than normal t/c ratio of member 22, disposed above the root 34, results in a speed-dependent incremental drag increase to D'T acting over the moment arm s (FIG. 1) which produces a pitching moment having the desired nose-up sense to counteract the nose-down "Mach tuck" effect described above. The magnitude of the increase in drag DT to D'T of member 22 is determined first theoretically and then confirmed empirically by adjusting the t/c ratio until the nose-up pitching moment matches, as a function of airspeed, the nose-down "Mach tuck."

The modification of member 22 which increases the t/c ratio involves thickening the lateral spacing of the side surfaces of member 22 relative to a conventional thickness, in which the latter is shown for comparison by the dotted lines in cross-sectional FIGS. 4b and 4c. While the absolute values of the t/c ratio and the relative position at which the increasing t/c ratio commences will vary depending upon the characteristics of the aircraft, FIG. 4e shows a presently preferred plot of the t/c ratio as a function of a member height between its root 34 and tip 36 (see FIG. 4a).

In FIG. 4e, the thickness of member 22 relative to the chord commences at a moderate value at the root of root 34 where member 22 is aerodynamically flared to blend into the upper surface of fuselage 14. Thereafter, the t/c ratio decreases, as in the case of a conventional vertical tail member, and then flattens out as a function of height for approximately the remaining lower one-third of the overall member height. Thereafter, commencing at this approximately one-third height position, member 22 is modified in accordance with the invention to commence an increasing t/c ratio that continues with a constant slope to the member tip 36. The increasing t/c ratio commences approximately at the cross section taken at seciton line 4c—4c of FIG. 4a.

The increasing t/c ratio depicted by the plot in FIG. 4e and the cross-sectionals of FIGS. 4c and 4b are in marked contrast to conventional vertical fin designs in which the t/c ratio is held relatively constant with height after initially decreasing in the vicinity of the member root 34 as indicated by the dotted line in the graph of FIG. 4e. As is known per se, a larger t/c ratio produces relatively greater aerodynamic drag, and this larger drag is distributed over the upper two-thirds of member 22 so as to act at a sufficient elevation or distance s above the X,Y plane (FIG. 1) which contains pitch axis 16 to produce the compensating speed-dependent, nose-up component of pitching moment.

By the above shaping of the t/c ratio of member 22, a speed-dependent component of pitching moment contributed by the vertical tail member 22 is matched so as to be opposite in rotation to the characteristic "Mach tuck" pitching moment of the aircraft. FIG. 4f shows, by a solid line 40, an increasingly larger pitch-up component $m\mu$ t as a function of aircraft speed in the regime from $M\infty 0.5$ through 0.9. It is observed that the shape and position of pitching moment component 40 in FIG. 4f is approximately the mirror image of the "Mach tuck" effect of the aircraft as shown by dotted line 32 in FIG. 3. These opposed effects, when exerted through their respective moment arms d' and s (see FIG. 1), are selected in this preferred embodiment to produce a generally flat overall pitching moment $m\mu$ illustrated by the plot of solid line 30 in FIG. 3. For comparison, a conventional configuration of a vertical fin member of a typical aircraft's tail section will develop some drag and produce a slight pitch-up moment as depicted by dotted line 44 in FIG. 4f. Note that the slight increase in the magnitude of the positive or pitch-up component of dotted line 42 does not in any way match (in the opposite sense) the magnitude versus airspeed function of the pitch-down moment plotted by dotted line 32 in FIG. 3.

Figure 5A:
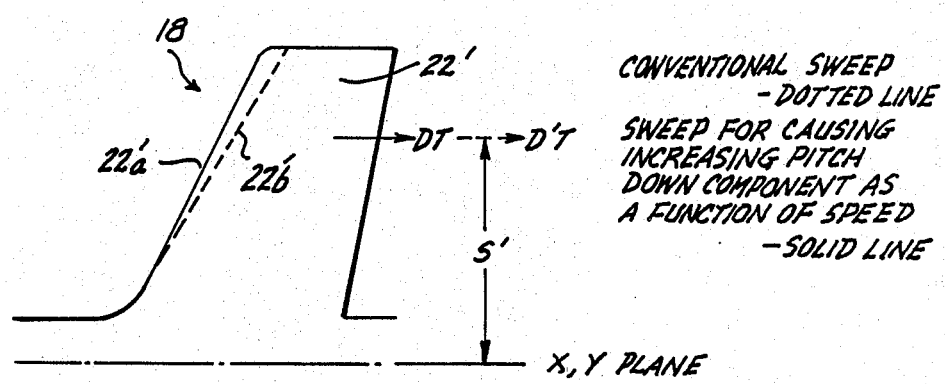
FIG. 5a is a fragmentary, elevational view of the vertical tail member configured in accordance with an alternative embodiment for creating a drag versus speed function that cancels out the speed-dependent, nose-down pitching component.

An alternative and also preferred embodiment of the tail section 18 is shown in FIG. 5a in which the compensating, speed-dependent drag DT and incremental increase in such drag D'T is developed by a reduced sweep of the leading edge 22'a of member 22' relative to a conventional sweep of the vertical fin. Swept edge 22'a, for example, may be from 5 to 20% less than the sweep of the leading edge 22'b of a conventional member design as shown by a dotted line in FIG. 5a. The reduced sweep of edge 22'a creates an incremental drag as a function of airspeed which acts at a location on member 22' elevated above the horizontal X,Y plane referred to above in connection with FIG. 1 and, hence, at a moment arm s' from the plane containing the pitch axis. The angle of sweep 22'a is selected first by theory, and then confirmed by empirical wind tunnel testing to establish an incremental drag D'T-DT that acts over moment arm s' to produce the desired compensating, speed-dependent, nose-up pitching component.

Figure 5B:
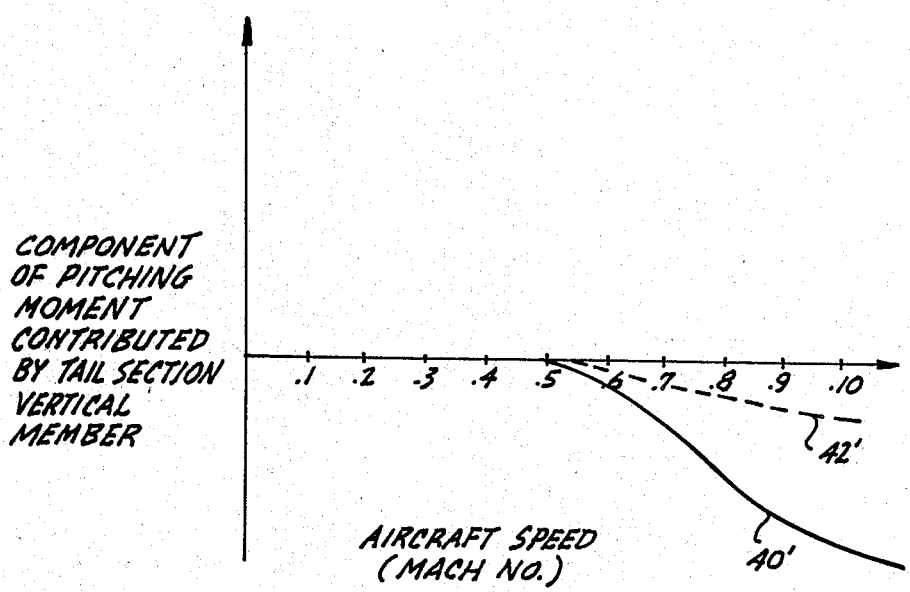
FIG. 5b is a graph in which the component of pitching moment attributed to the vertical tail member of FIG. 5a is plotted as a function of aircraft speed.

FIG. 5b plots by solid line 40', the effective speed-dependent, nose-up pitching component contributed by the change in leading edge sweep of vertical tail member 22' as a function of airspeed. For comparison, the corresponding nose-up pitching moment of a conventionally swept vertical tail member is shown by the dotted line 42', again plotted as a function of airspeed. Note that the pitching moment components 40' and 42' of FIG. 5b are similar to the corresponding pitching moment components 40 and 42 of FIG. 4f.

While only particular embodiments have been disclosed herein, it will be readily apparent to persons skilled in the art that numerous changes and modifications can be made thereto, including the use of equivalent means and devices without departing from the spirit of the invention. For example, the modified, drag creating shape of the vertical tail member can incorporate a combination of the t/c ratio and reduced sweep features of the embodiments of FIGS. 4a and 5a; or other selective drag modifying effects can be employed on the tail member. Further, while the above-disclosed and preferred embodiments are shown in combination with a swept wing aircraft, the invention is also useful on non-swept wing aircraft that exhibit the above-mentioned "Mach tuck" effect.

The embodiments of the invention in which an exclusive property or privilege is claimed are defined as follows:

1. An aircraft comprising the combination of a fuselage, swept wings mounted near mid-body of the fuselage and a tail section, and having a characteristic speed-dependent, nose-down pitching moment due to rearward movement of the center of lift pressure on the wings as the aircraft while in level flight increases speed in a predetermined speed regime, said tail section having a vertical tail member rising from a root connected to said fuselage and terminating at a tip, said vertical tail member being so configured between said root and tip to provide a passive means for developing a compensating drag component that increases as the speed of said aircraft increases in said predetermined speed regime and acts on said tail member above its root so as to produce a speed-dependent, nose-up pitching component that substantially matches in magnitude versus speed, said characteristic speed-dependent, wing associated, nose-down pitching moment of the aircraft, so as to passively counteract said characteristic nose-down pitching moment.

2. The aircraft set forth in claim 1, wherein said vertical tail member has a configuration for developing said drag component that comprises a thickness to chord ratio (t/c) distribution between said root and tip in which said ratio (t/c) first decreases with tail member height measured from said root, then increases from an intermediate height on said tail member toward said tip.

3. The aircraft set forth in claim 1, wherein said vertical tail member has a configuration for developing said drag component that comprises a thickness to chord ratio (t/c) distribution between said root and tip in which said ratio (t/c) first decreases with tail member height measured from said root to a first intermediate height positon, then remains substantially constant with tail member height between said first intermediate height position and a second intermediate height position, and then said ratio (t/c) increases in height between said second intermediate height position and said tip.

4. The aircraft of claim 3, wherein said second intermediate height position is located at substantially one third of the total height of said vertical tail member between said root 11 and tip.

5. The aircraft of claim 1, wherein said vertical tail member comprises an upwardly and rearwardly swept leading edge that has a reduced sweep angle, less than that which would be chosen to meet the requirements of minimal drag and optimum lateral stability for said predetermined speed regime, and said reduced sweep angle of said member creating said drag component so as to produce said speed-dependent, nose-up pitching component.

6. The aircraft of claim 1, wherein said predetermined speed regime is from Mach$_\infty$ 0.5 to Mach$_\infty$ 1.0.

7. In an aircraft having a fuselage, swept wings mounted near mid-body of the fuselage and a tail section including a vertical tail member, and exhibiting a characteristic speed-dependent, wing-associated, nose-down pitching moment due to rearward shifting of a center of lift pressure on the wings as the aircraft while in level flight increases speed in a predetermined speed regime, the combination therewith of passive means associated with said vertical tail member of said tail section for developing a compensating drag characteristic that increases as the speed of said aircraft increases in said predetermined speed regime and has a magnitude and acts on said vertical tail member so as to produce a speed-dependent, nose-up pitching component selected to substantially match in magnitude versus speed, said speed-dependent, wing associated, nose-down pitching moment of the aircraft.

8. In the aircraft of claim 7, said vertical tail member has a root connected to said fuselage and rises to a tip and has a configuration for increasing said drag characteristics that comprises a thickness to chord ratio (t/c) distribution between said root and tip in which said ratio (t/c) first decreases with tail member height measured from said root, then increases from an intermediate height on said tail member toward said tip.

9. In the aircraft of claim 7, wherein said vertical tail member comprises an upwardly and rearwardly swept leading edge that has a reduced sweep angle, less than that which would be chosen to meet the requirements of minimal drag and optimum lateral stability for said predetermined speed regime, and said reduced sweep angle of said member creating said drag characteristic so as to produce said speed-dependent, nose-up pitching component.

* * * * *

UNITED STATES PATENT AND TRADEMARK OFFICE
CERTIFICATE OF CORRECTION

PATENT NO.  : 4,784,353
DATED       : November 15, 1988
INVENTOR(S) : A. Sigalla It is certified that error appears in the above-identified patent and that said Letters Patent is hereby corrected as shown below:

Column 4, line 44: "piching" should be --pitching--

Column 4, line 48: "$M\mu = 1$" should be --$M_\infty = 1$--

Signed and Sealed this

Twenty-second Day of August, 1989

Attest:

DONALD J. QUIGG

Attesting Officer

Commissioner of Patents and Trademarks